United States Patent
Parikh et al.

(10) Patent No.: US 9,984,150 B2
(45) Date of Patent: May 29, 2018

(54) CATEGORY MANAGEMENT AND ANALYSIS

(75) Inventors: Nishith Parikh, Fremont, CA (US); Neelakantan Sundaresan, Mountain View, CA (US); Zeqian Shen, San Jose, CA (US); Chi-Hsien Chiu, San Jose, CA (US)

(73) Assignee: eBay Inc., San Jose, CA (US)

( * ) Notice: Subject to any disclaimer, the term of this patent is extended or adjusted under 35 U.S.C. 154(b) by 1302 days.

(21) Appl. No.: 13/072,589

(22) Filed: Mar. 25, 2011

(65) Prior Publication Data

US 2011/0238665 A1     Sep. 29, 2011

Related U.S. Application Data (60) Provisional application No. 61/318,225, filed on Mar. 26, 2010.

(51) Int. Cl.
*G06F 7/00* (2006.01)
*G06F 17/30* (2006.01)
*G06Q 30/06* (2012.01)

(52) U.S. Cl.
CPC ....... *G06F 17/30643* (2013.01); *G06Q 30/06* (2013.01)

(58) Field of Classification Search
CPC .... G06Q 30/02; G06Q 30/0601; G06Q 30/06; G06Q 30/0641; G06Q 30/0201; G06F 17/3087; G06F 17/30277; G06F 17/30554; G06F 17/30643
See application file for complete search history.

(56) References Cited

U.S. PATENT DOCUMENTS

| | | | | |
|---|---|---|---|---|
| 6,269,361 | B1 * | 7/2001 | Davis | G06F 17/30864 |
| 6,766,304 | B2 * | 7/2004 | Kemp, II | G06Q 30/08 |
| | | | | 705/35 |
| 7,584,192 | B2 * | 9/2009 | Rey et al. | |
| 2003/0195877 | A1 * | 10/2003 | Ford | G06F 17/30705 |
| 2005/0091140 | A1 * | 4/2005 | Sloan | G06Q 40/04 |
| | | | | 705/37 |
| 2005/0114273 | A1 * | 5/2005 | Ettinger, Jr. | G06Q 10/087 |
| | | | | 705/80 |
| 2005/0137939 | A1 * | 6/2005 | Calabria | G06Q 30/02 |
| | | | | 705/26.1 |
| 2005/0216454 | A1 * | 9/2005 | Diab | G06F 17/30864 |
| 2006/0271460 | A1 * | 11/2006 | Hanif | G06Q 20/102 |
| | | | | 705/35 |
| 2007/0100709 | A1 * | 5/2007 | Lee | G06Q 30/02 |
| | | | | 705/26.62 |
| 2007/0112635 | A1 * | 5/2007 | Loncaric | G06Q 30/02 |
| | | | | 705/7.35 |

(Continued)

*Primary Examiner* — Hasanul Mobin
(74) *Attorney, Agent, or Firm* — Shook, Hardy & Bacon L.L.P.

(57) ABSTRACT

A method and system analyze data associated with a marketplace category. In some embodiments, a query is received that identifies a marketplace category from multiple marketplace categories associated with an electronic commerce marketplace. Data associated with the marketplace category is accessed and analyzed to identify multiple keywords used to identify listings in the marketplace category. A user interface is generated to display the analysis results, including at least a portion of the multiple keywords used to identify listings in the marketplace category.

20 Claims, 9 Drawing Sheets

(56) References Cited

U.S. PATENT DOCUMENTS

| | | | |
|---|---|---|---|
| 2007/0150370 A1* | 6/2007 | Staib et al. | 705/26 |
| 2007/0266002 A1* | 11/2007 | Chowdhury | G06F 17/30648 |
| 2007/0288602 A1* | 12/2007 | Sundaresan | G06Q 30/06 |
| | | | 709/219 |
| 2008/0040220 A1* | 2/2008 | Levy | G06Q 30/0226 |
| | | | 705/14.27 |
| 2008/0071631 A1* | 3/2008 | Nagarajayya | G06Q 30/02 |
| | | | 705/26.3 |
| 2008/0183596 A1* | 7/2008 | Nash | G06F 17/30979 |
| | | | 705/26.1 |
| 2008/0183664 A1* | 7/2008 | Cancel | G06Q 30/02 |
| 2008/0249991 A1* | 10/2008 | Valz | G06F 17/30867 |
| 2009/0187485 A1* | 7/2009 | Loui | G06Q 30/0225 |
| | | | 705/14.26 |
| 2010/0114883 A1* | 5/2010 | Chea | G06F 17/30719 |
| | | | 707/730 |
| 2010/0223157 A1* | 9/2010 | Kalsi | 705/27 |
| 2010/0299190 A1* | 11/2010 | Pratt | G06Q 30/02 |
| | | | 705/14.4 |
| 2011/0004509 A1* | 1/2011 | Wu | G06F 17/3053 |
| | | | 705/7.37 |

* cited by examiner

702 — Category - click on a category to view

Business & Industrial
Cameras & Photo
Cell Phones & PDAs
Clothing, Shoes & Accessories
Coins & Paper Money
▶ Collectibles
   Advertising
   Animals
   Animation Art & Characters
   Arcade, Jukeboxes & Pinball
   Autographs
   Banks, Registers & Vending
   Barware
      Absinthe Accessories
      Bar Sets
      Casters
      Corkscrews
      Decantors
      Glasses, Cups, Mugs
      Guides, Recipes, Games 704 — Top Keywords | Top Sellers | Hot Keywords | Top Bidding Items

706

Item ID: 150569332648
VINTAGE PAIR CARTIER STERLING SILVER BRANDY GLASSES, 4OZ
Current Bids: 26
Current Price: $242.50

Item ID: 1110657333124
ART DECO CHAMPAIGN BUCKET CHRISTOFLEL. LANE NORMANDIE
Current Bids: 25
Current Price: $128.50

Item ID: 350443679954
DECO VASELINE GREEN SHOT ETCHED GLASS DEPRESSION TRAY
Current Bids: 25
Current Price: $51.00

CATEGORY MANAGEMENT AND ANALYSIS

RELATED APPLICATION

This application claims the benefit of U.S. Provisional Application Ser. No. 61/318,225, entitled "CATEGORY MANAGEMENT AND ANALYSIS", filed Mar. 26, 2010, the disclosure of which is incorporated herein by reference in its entirety.

TECHNICAL FIELD

The present disclosure generally relates to data processing techniques and, more specifically, to methods and systems for category management and analysis.

BACKGROUND

Advancements in computer and networking technology have enabled users and entities to conduct various types of transactions online via computer-based applications and systems. These advancements have caused the growth of electronic commerce, commonly referred to as "ecommerce", and the development of ecommerce marketplaces that allow multiple users and entities to shop and execute various online transactions.

In large ecommerce marketplaces supporting numerous transactions, products and services are typically separated into multiple categories. As the number of categories grows, sellers in the ecommerce marketplace may experience difficulties in determining how to best sell their products or services within the multiple category structure.

BRIEF DESCRIPTION OF THE DRAWINGS

Some embodiments are illustrated by way of example and not limitation in the figures of the accompanying drawings.

DETAILED DESCRIPTION

Example methods and systems to provide category management and analysis are described. In the following description, for purposes of explanation, numerous specific details are set forth in order to provide a thorough understanding of example embodiments. It will be evident, however, to one skilled in the art that the present invention may be practiced without these specific details.

The methods and systems described herein allow users (e.g., sellers and buyers) to identify information associated with categories in an ecommerce marketplace. In particular embodiments, users can determine what items are popular among marketplace customers based on keywords used by the customers when shopping or searching for products in the ecommerce marketplace. For example, a seller may choose to sell items that are currently popular among customers shopping in the marketplace. Additionally, sellers may review historical customer shopping/search data to determine the best time of year to sell particular types of products in the marketplace.

The methods and systems further allow users to identify top sellers in a particular category and identify the best-selling items in one or more categories. This information is beneficial to sellers as well as buyers using the ecommerce marketplace. For example, sellers benefit by identifying popular items within a particular marketplace category and buyers benefit by identifying top sellers of particular items in the marketplace.

As used herein, "keyword" refers to one or more words, characters, numerals or symbols used to identify listings or other information within a marketplace. The terms "keyword" and "search term" are used interchangeably herein. Additionally, as used herein, a "user" or an "entity" may be a person (e.g., a human), a business (e.g., a company), an organization, a group of people, a persona (e.g., a fictitious character), or any combination thereof.

Figure 1:
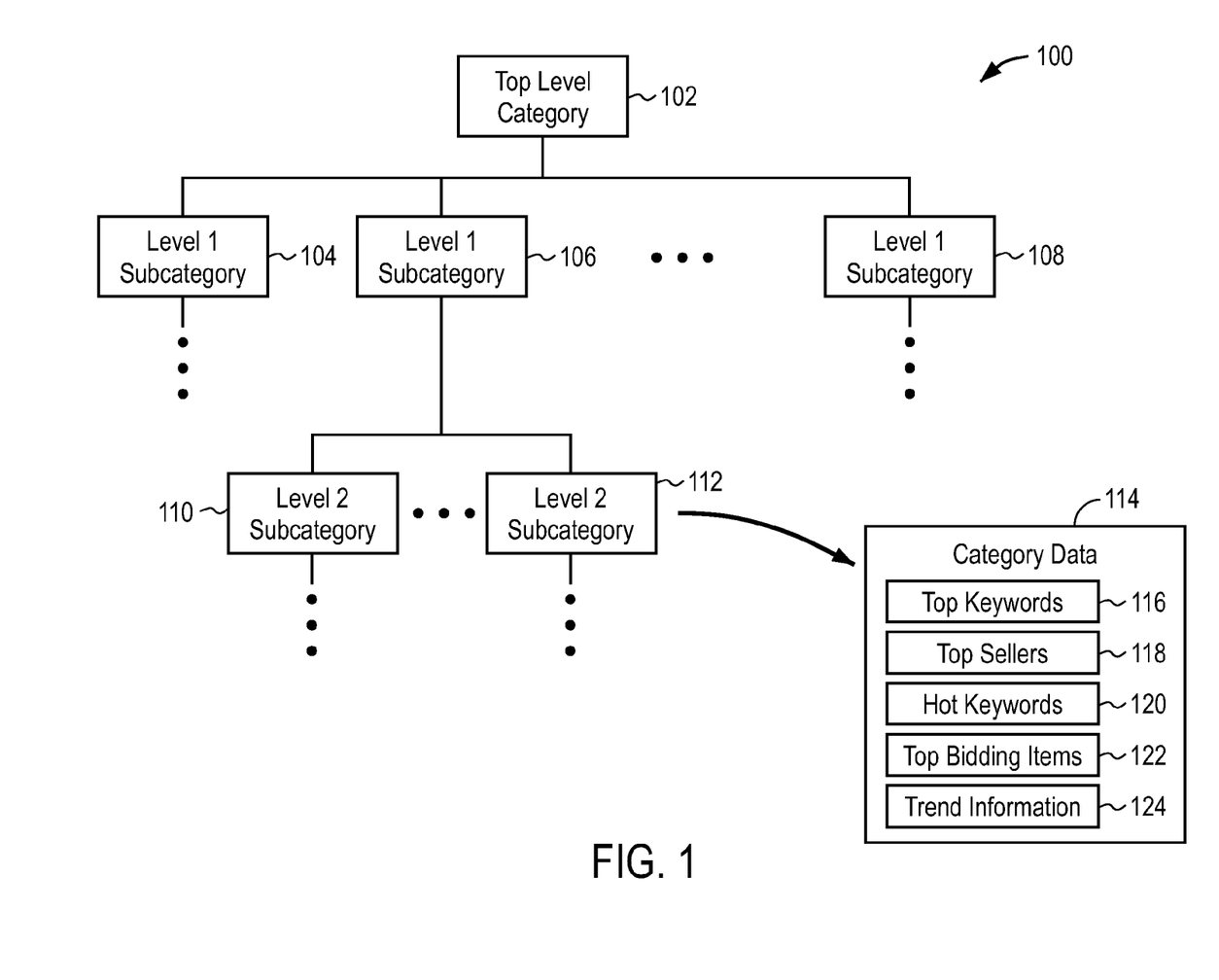
FIG. 1 is an example hierarchy of categories for use with an ecommerce marketplace or trading application.

FIG. 1 is an example hierarchy 100 of categories for use with an ecommerce marketplace or trading application. Category hierarchy 100 includes a top level category 102 and multiple subcategories below the top level category. For example, a first level of subcategories below top level category 102 includes "level 1 subcategories" 104, 106, and 108. Another level of subcategories ("level 2 subcategories") 110 and 112 are associated with level 1 subcategory 106. In a particular embodiment, each successive level of subcategories provides additional focus or granularity for the preceding category level. For example, a "collectibles" top level category may include level 1 subcategories of "autographs", "glassware", and "pinball machines", all of which are specific types of collectibles. In this example, the level 1 subcategory "autographs" includes level 2 subcategories "sports legends", "movie stars", and "presidents", all of which are specific types of autographs. Each of these level 2 subcategories may be further separated into multiple level 3 subcategories, such as sports legends related to different sports (e.g., level 3 subcategories of football, baseball, basketball, and hockey). Additional examples of categories and associated subcategories are illustrated in FIGS. 3-7 and discussed herein.

As used herein, a "category" includes a top level category as well as any subcategories located at any level within category hierarchy 100. Any category within category hierarchy 100 may include data related to one or more types of category data 114. This category data 114 includes top keywords 116 related to the particular category. Top keywords 116 include the most popular or most frequently searched keywords in the particular marketplace category. Category data 114 also includes top sellers 118, hot keywords 120, top bidding items 122, and trend information 124. Top sellers 118 include entities that have a high number of transactions in the particular marketplace category (e.g., sellers who have sold the most items or services in the marketplace category over a defined time period). Hot keywords 120 include keywords that have a high popularity within the marketplace category at a current time. Hot keywords 120 are also referred to as "buzz keywords". Top bidding items 122 include listings within the marketplace category having the highest number of bids. Trend information 124 identifies changes in keyword popularity over a defined time period. In a particular embodiment, category data 114 associated with multiple categories is stored in a common database or other data storage mechanism. Additional details regarding category data 114 are discussed herein.

Although FIG. 1 illustrates a single top level category 102, particular embodiments may include any number of top level categories, as well as any number of additional category levels below the top level categories. Further, the example hierarchical arrangement of categories shown in FIG. 1 is for purposes of explanation. Specific embodiments may utilize any data structure and may arrange categories in any manner. Particular ecommerce marketplaces may include hundreds or thousands of different categories to organize various listings for items, services, and the like.

Figure 2:
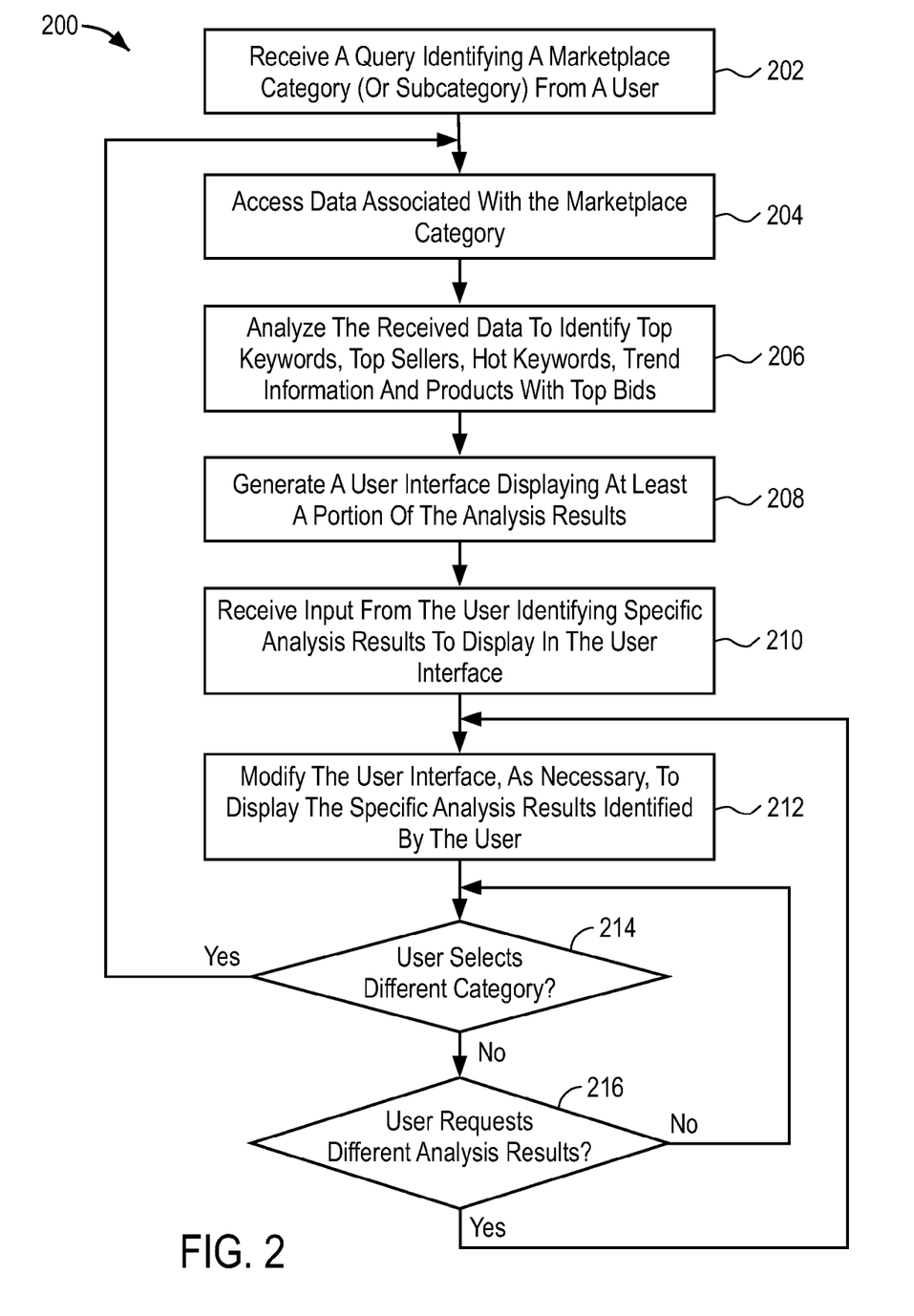
FIG. 2 is a flow diagram of a method, in accordance with an embodiment, for analyzing category data and generating a user interface to display analysis results.

FIG. 2 is a flow diagram of a method 200, in accordance with an embodiment, for analyzing category data and generating a user interface to display analysis results. In a particular embodiment, method 200 is implemented by a processor or computing system, such as one or more of the processors and computing systems discussed below with respect to FIGS. 8 and 9. Initially, method 200 receives a query identifying a marketplace category from a user at 202. As used herein, a "marketplace category" includes any category or subcategory within a marketplace for grouping or otherwise separating different listings, items, and so forth. In one embodiment, the user may select the marketplace category from a hierarchical arrangement of the type shown in FIG. 1. Alternatively, the user may select the marketplace category using a search function or other category identification mechanism, such as the category listings shown in FIGS. 3-7.

After receiving the user query, method 200 accesses data associated with the identified marketplace category at 204. This data includes, for example, data associated with keywords used to identify listings within the marketplace category. The data may also include transaction information, listing information, and details regarding entities associated with transactions in the marketplace category. At 206, the method analyzes the received marketplace category data to identify top keywords, top sellers, hot keywords, trend information, and products with top bids associated with the category.

After analyzing the marketplace category data, a user interface is generated that displays at least a portion of the analysis results at 208. For example, a particular user interface is a graphical user interface that displays top keywords and trend information associated with one or more of the top keywords. Other user interface embodiments are discussed below with respect to FIGS. 3-7. An embodiment of the user interface displays at least a portion of the analysis results and provides an option (e.g., display tabs) to display different portions of the analysis results. In this embodiment, input is received from the user at 210 that identifies specific analysis results to display in the user interface (e.g., top keywords, top sellers, hot keywords, top bidding items or keyword trend information). The user interface is modified, if necessary, at 212 to display the specific analysis results identified by the user. If the user selects a different marketplace category at 214, the method returns to operation 204, which accesses data associated with the newly selected marketplace category. If the user requests different analysis results at 216, the method returns to operation 212, which modifies the user interface to display the requested analysis results. Method 200 continues to modify the user interface based on user input associated with marketplace categories, requested analysis results, and so forth.

Figure 3:
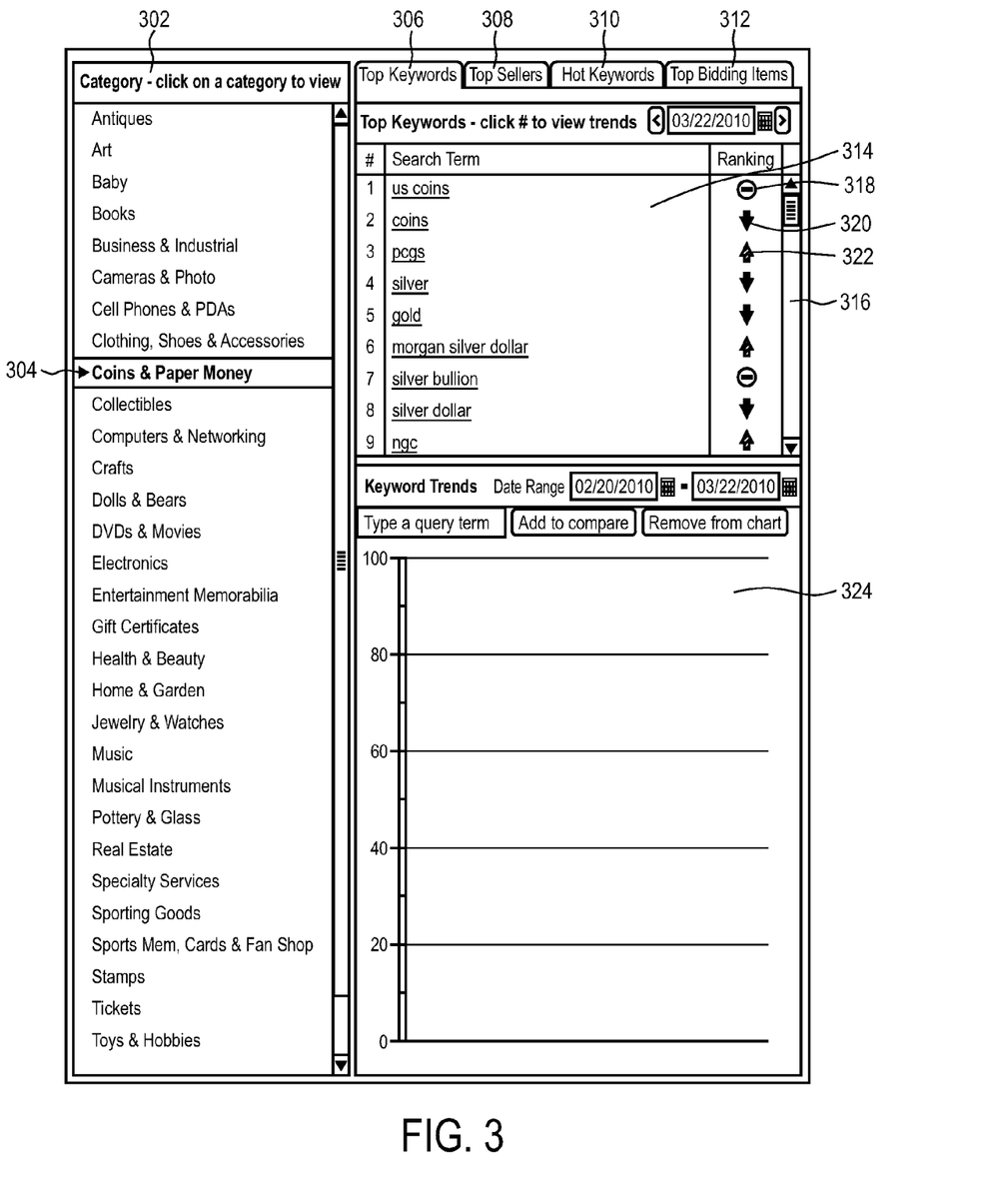
FIG. 3 is an example of a user interface depicting top keywords in a marketplace category.

FIG. 3 is an example of a user interface 300 depicting top keywords in a marketplace category. The left side of user interface 300 provides a category display portion 302 that lists multiple categories supported by the marketplace. In this example, a "Coins & Paper Money" category 304 is highlighted (e.g., selected by a user). In a particular embodiment, selection of a category in the category display portion 302 causes user interface 300 to generate a listing of subcategories associated with the selected category. In that embodiment, the user can select the main category or one of the listed subcategories as the category for which top keyword information is displayed in the user interface.

After a particular marketplace category 304 is selected, the user can select among various tabs to display specific data associated with the selected category. For example, in user interface 300, the user is presented with a "Top Keywords" tab 306, a "Top Sellers" tab 308, a "Hot Keywords" tab 310, and a "Top Bidding Items" tab 312. Although FIG. 3 illustrates various tabs 306-312, in alternate embodiments, any type of user-selectable display element (e.g., a button, an icon or other visual indicator) may be used in place of these tabs.

In the example of FIG. 3, "Top Keywords" tab 306 is the currently selected tab, which causes a top keywords display portion 314 to display a listing of top keywords associated with the selected marketplace category 304. As mentioned above, top keywords include the most popular or most frequently searched keywords in the selected marketplace category. The top keywords include, for example, keywords entered by users seeking to purchase a particular item within the marketplace category. Keywords may include item names, item features, brands, model numbers, product codes, and any other information useful in identifying a particular item or listing. In user interface 300, the top nine keywords are included in display portion 314. These top nine keywords are associated with the "Coins & Paper Money" category 304. The user is able to scroll through the listing of top keywords (using a scroll bar 316) to see keywords positioned lower in the list (e.g., below the ninth position).

Display portion 314 includes a ranking associated with each of the displayed top keywords. The ranking uses visual indicators to identify whether a particular keyword's popularity is increasing (visual indicator 322), decreasing (visual indicator 320) or unchanged (visual indicator 318). In alternate embodiments, any type of visual indicator, numerical ranking, or other information may be presented to show whether a keyword's popularity is increasing, decreasing or unchanged, over time.

The content displayed in user interface 300 is changed each time a user selects a different marketplace category. For example, if the user selects a "Dolls & Bears" marketplace category in the category display portion 302, the currently displayed top keywords (including top keyword popularity information) are replaced with the top keywords associated with the "Dolls & Bears" marketplace category.

In one embodiment, the top keywords associated with a particular marketplace category are recalculated at regular time intervals, such as once per hour, once per day or once per week. Additionally, the visual indicators that identify changes in the keyword popularity (e.g., increasing, decreasing or unchanged) are recalculated at the same interval as the top keyword listing. Display portion 314 also includes a date, which allows a user to see top keywords on a specific calendar date. In one embodiment, the value of this date defaults to the current date, which can be changed by the user to any previous date for which keyword data is available. Each time the date is changed, the top keywords displayed in display portion 314 are updated, as necessary, to include the top keywords for the selected marketplace category on the selected date.

User interface 300 also includes a keyword trend display portion 324 that displays trends (e.g., popularity trends) of one or more keywords selected by the user. In the example of FIG. 3, the user has not yet selected a keyword for displaying trend information.

Figure 4:
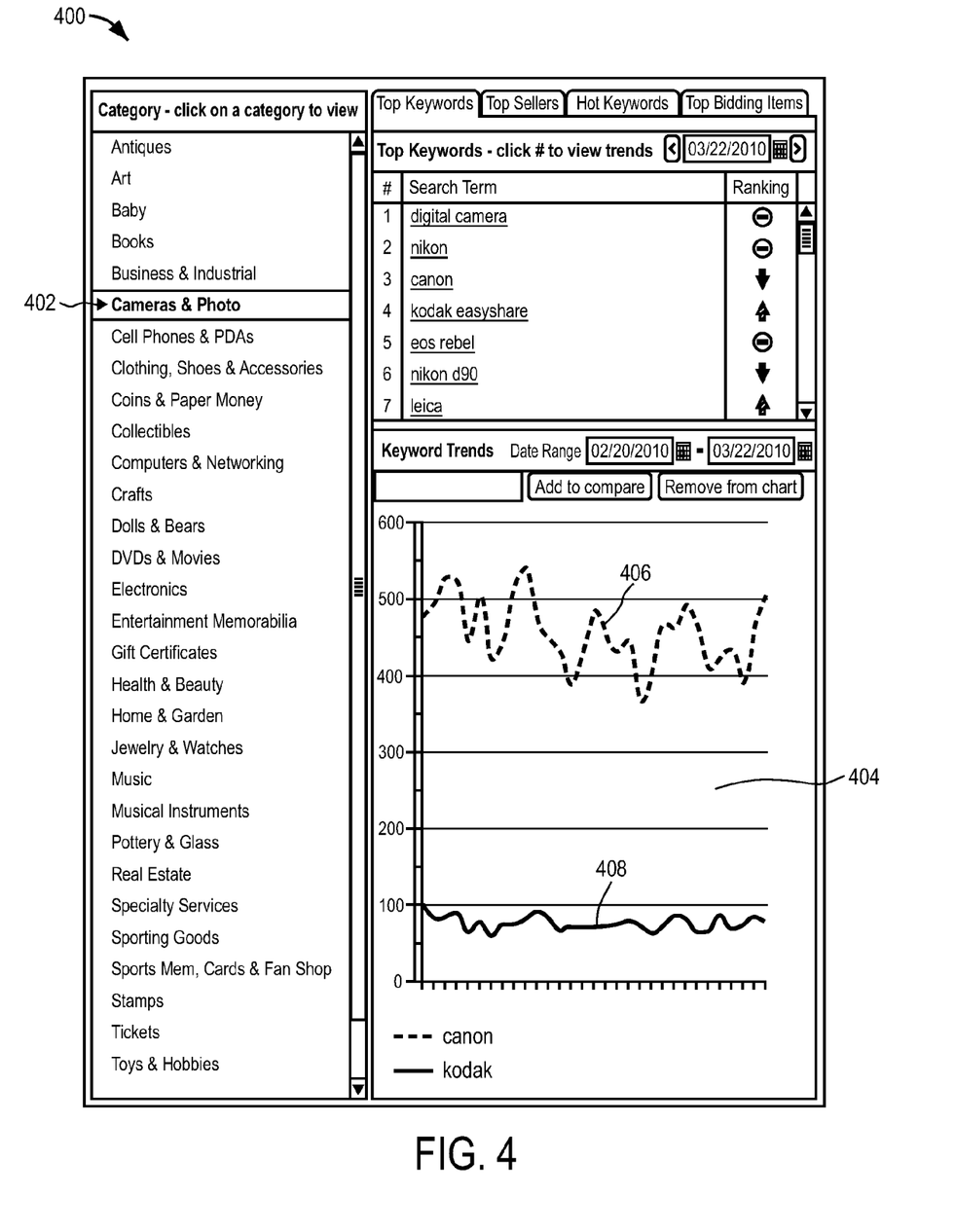
FIG. 4 is an example of another user interface depicting top keywords and keyword trends in a marketplace category.

FIG. 4 is an example of another user interface 400 depicting top keywords and keyword trends in a marketplace category. In the example of FIG. 4, a user has selected a marketplace category "Cameras & Photo" 402. The top seven keywords associated with marketplace category 402 are displayed for a particular date (Mar. 22, 2010). As shown in FIG. 4, the top seven keywords include general terms (e.g., digital camera), particular camera brands (e.g., nikon and canon), and specific camera models (e.g., nikon d90).

User interface 400 also includes a keyword trend display portion 404 that displays trends for multiple keywords over a particular period of time. In the example of FIG. 4, two keyword trends are displayed for keyword "canon" (identified by a broken line 406) and keyword "kodak" (identified by a solid line 408). The range of dates for the displayed keyword trends extends from Feb. 20, 2010 to Mar. 22, 2010. These dates may be adjusted by the user to show keyword trends over any range of dates. Additionally, any number of keyword trends can be displayed in display portion 404. The displayed keyword trends may be associated with one of the category's top keywords or any other keyword selected by the user. The multiple keyword trends can be distinguished from one another using different line types (e.g., broken line and solid line), different line colors, and so forth.

In the example of FIG. 4, trend line 406 for keyword "canon" indicates a significantly higher number of search queries for the keyword "canon" than for the keyword "kodak" (trend line 408). This difference in trend lines 406 and 408 indicates that the keyword "canon" is more popular than the keyword "kodak" in the "Cameras & Photo" category. In one embodiment, the graph(s) shown in display portion 404 have a horizontal axis representing dates in the defined date range and a vertical axis representing a quantity of search queries for the associated keyword. In this embodiment, the keyword trend information is recalculated at regular intervals, such as daily, hourly or weekly time intervals.

Figure 5:
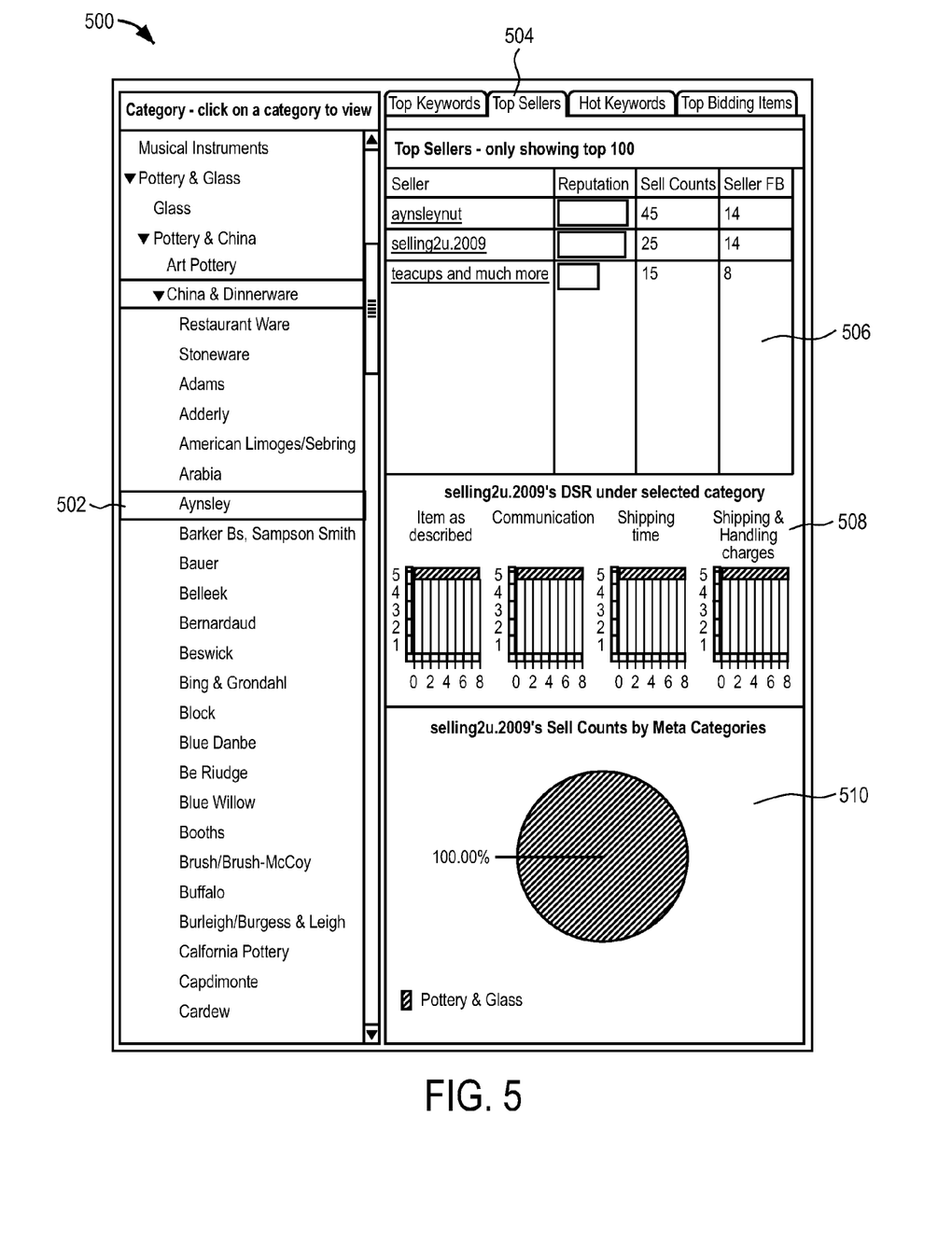
FIG. 5 is an example of another user interface depicting top sellers in a marketplace category.

FIG. 5 is an example of another user interface 500 depicting top sellers in a marketplace category. In this example, a marketplace category "Aynsley" 502 is selected for identifying top sellers in that category. The "Aynsley" category is a subcategory under "China & Dinnerware", which is a subcategory under "Pottery & China". A "Top Sellers" tab 504 is selected, which causes user interface 500 to display information regarding the top sellers within the "Aynsley" category 502 in a top seller display portion 506. In one embodiment, the information regarding the top sellers includes seller reputation, number of items sold during a particular time period (e.g., the last 30 days), and seller feedback scores. The number of items sold by a seller may also be referred to as a number of completed transactions.

The seller's reputation can be represented as a numerical value or as a visual indicator having different size, shape, and color characteristics depending on the seller's reputation. For example, a longer visual indicator represents a higher seller reputation. Additionally, different colors can represent high, medium, and low seller reputations. In one embodiment, a blue visual indicator is associated with a high seller reputation, a green visual indicator is associated with a medium seller reputation, and a red visual indicator is associated with a low seller reputation.

A seller's reputation may be based on a variety of factors, such as feedback from other users (e.g., buyers who completed transactions with the seller), an average speed with which items are shipped (or services are performed), a length of time the seller has participated in the ecommerce marketplace, and a number of refund requests initiated by buyers who purchased from the seller.

User interface 500 also includes a seller rating display portion 508 that includes visual indicators of detailed seller rating (DSR) scores for various categories, such as item description, seller communication, shipping time, and shipping/handling charges. The information displayed in seller rating display portion 508 is associated with a specific seller, which is selected from the listing of top sellers in display portion 506. User interface 500 further includes a category distribution of seller listings indicating a number of items or listings for a particular seller in various marketplace categories. In the example of FIG. 5, all of the listings associated with seller "selling2u.2009" are in the "Pottery and Glass" category.

Figure 6:
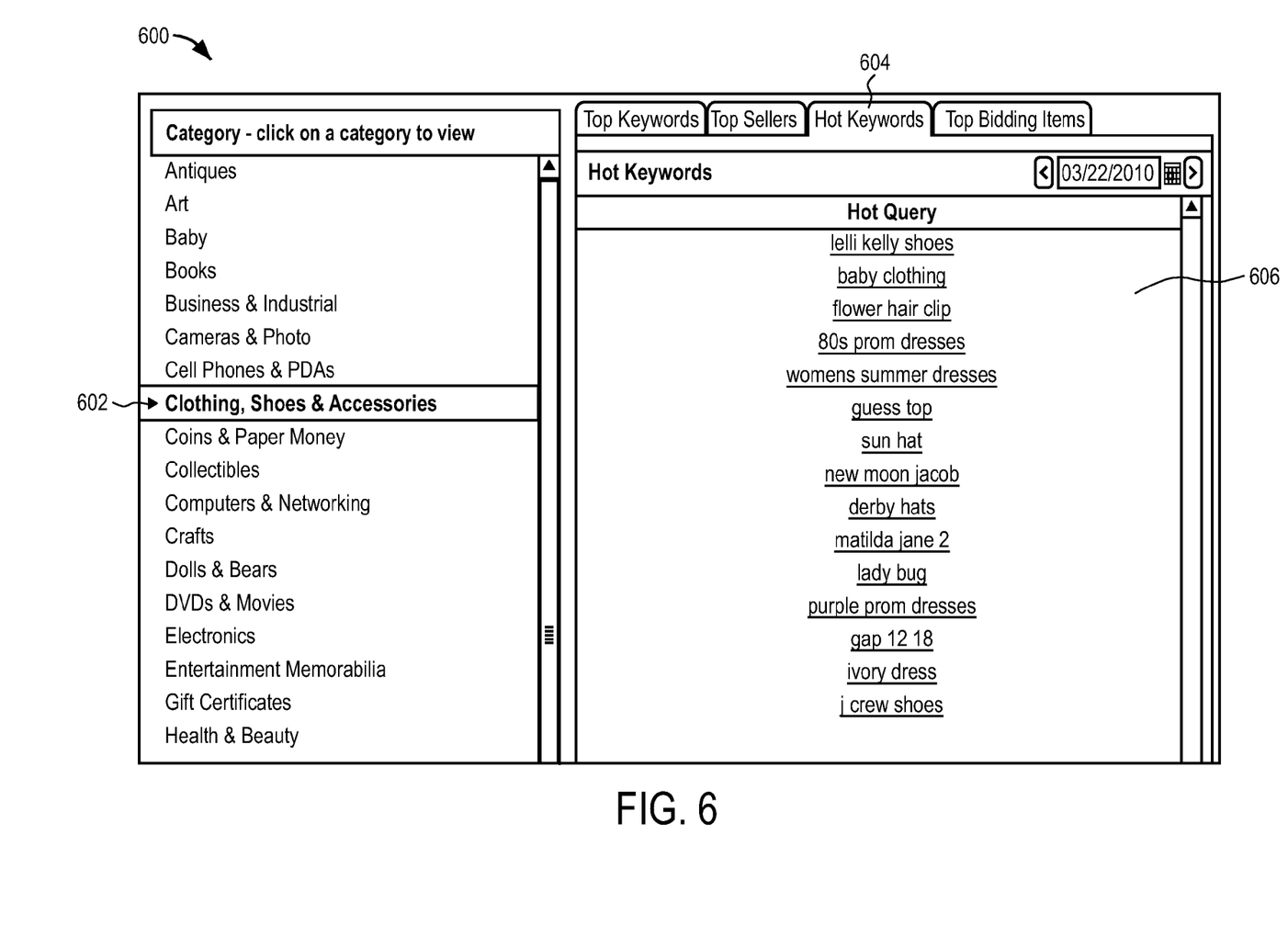
FIG. 6 is an example of another user interface depicting hot keywords in a marketplace category.

FIG. 6 is an example of another user interface 600 depicting hot keywords in a marketplace category. In user interface 600, a user has selected a "Clothing, Shoes & Accessories" category 602 and selected a "Hot Keywords" tab 604. Hot keywords are keywords associated with the selected category that have recently increased in popularity (e.g., within the past day or within the past hour), even though the keywords may not be considered a "top keyword" for the marketplace category. Particular keywords may become "hot keywords" based on recent events, holidays, and the like. "Hot keywords" may also be referred to as "buzz keywords".

Hot keywords can help sellers improve their sales by focusing selling activities on inventory that is currently in high demand, as indicated by the "hot keywords" listing for a particular marketplace category. In FIG. 6, the hot keywords associated with "Clothing, Shoes & Accessories" category 602 are shown in hot keyword display portion 606 of user interface 600. The hot keywords are displayed as of a particular date (e.g., Mar. 22, 2010). The user can change this date to study, for example, seasonal trends and plan their sales activities based on these trends. In a specific embodiment, data associated with "hot keywords" is refreshed more frequently than data associated with "top keywords" or keyword trends.

Figure 7:
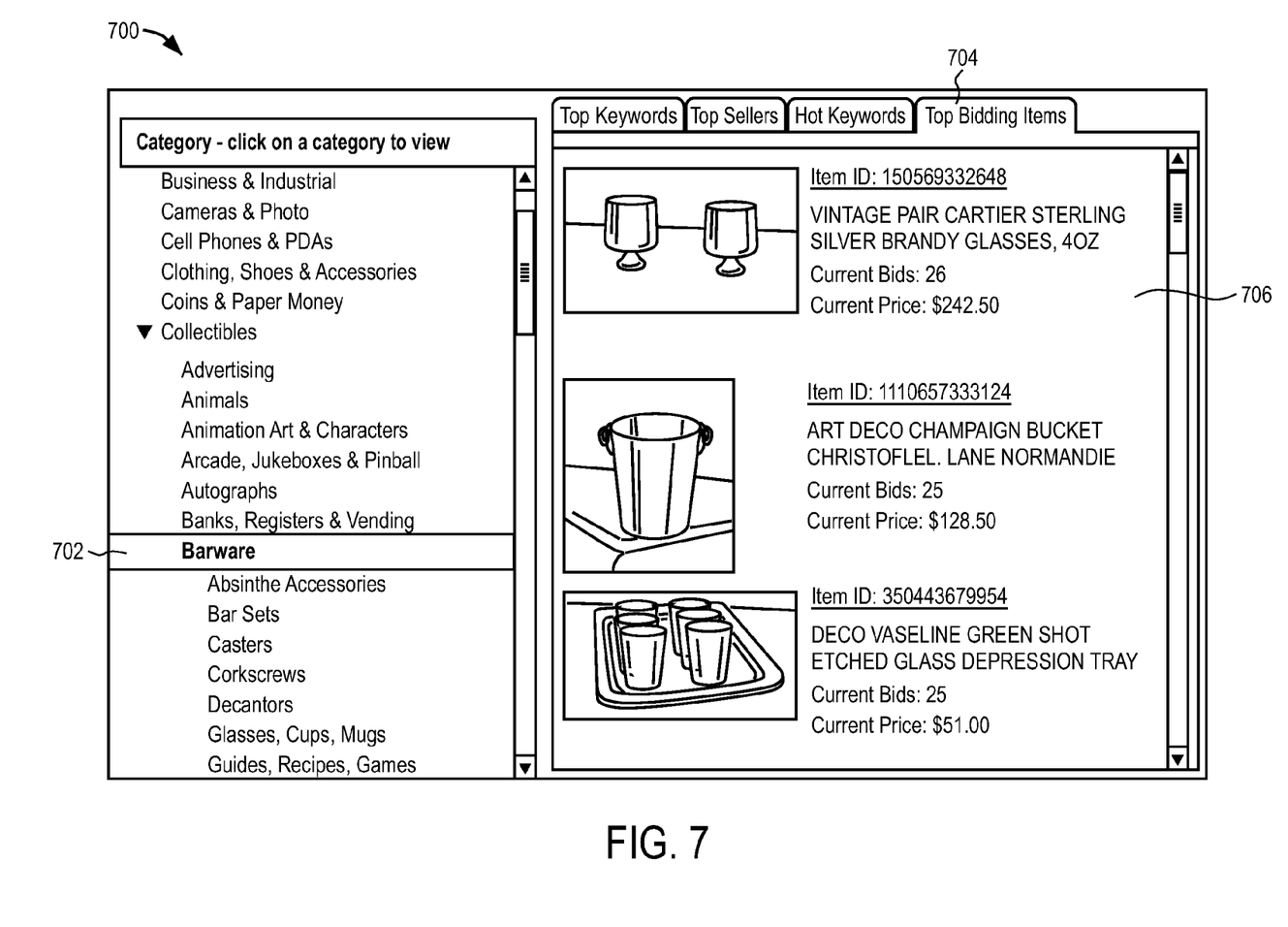
FIG. 7 is an example of another user interface depicting top bidding items in a marketplace category.

FIG. 7 is an example of another user interface 700 depicting top bidding items in a marketplace category. In user interface 700, a user has selected a "Barware" category 702 and selected a "Top Bidding Items" tab 704, which displays popular items in a top bidding display portion 706. In this example, the top bidding items displayed are associated with the "Barware" category 702. The top bidding items are determined based on the number of bids are placed for a particular item or listing. A higher number of bids placed is an indicator of a popularity associated with a particular item or listing. In alternate embodiments, top bidding items in a marketplace category are determined based on a number of items sold in a recent time period (e.g., during the past day or the past hour).

Figure 8:
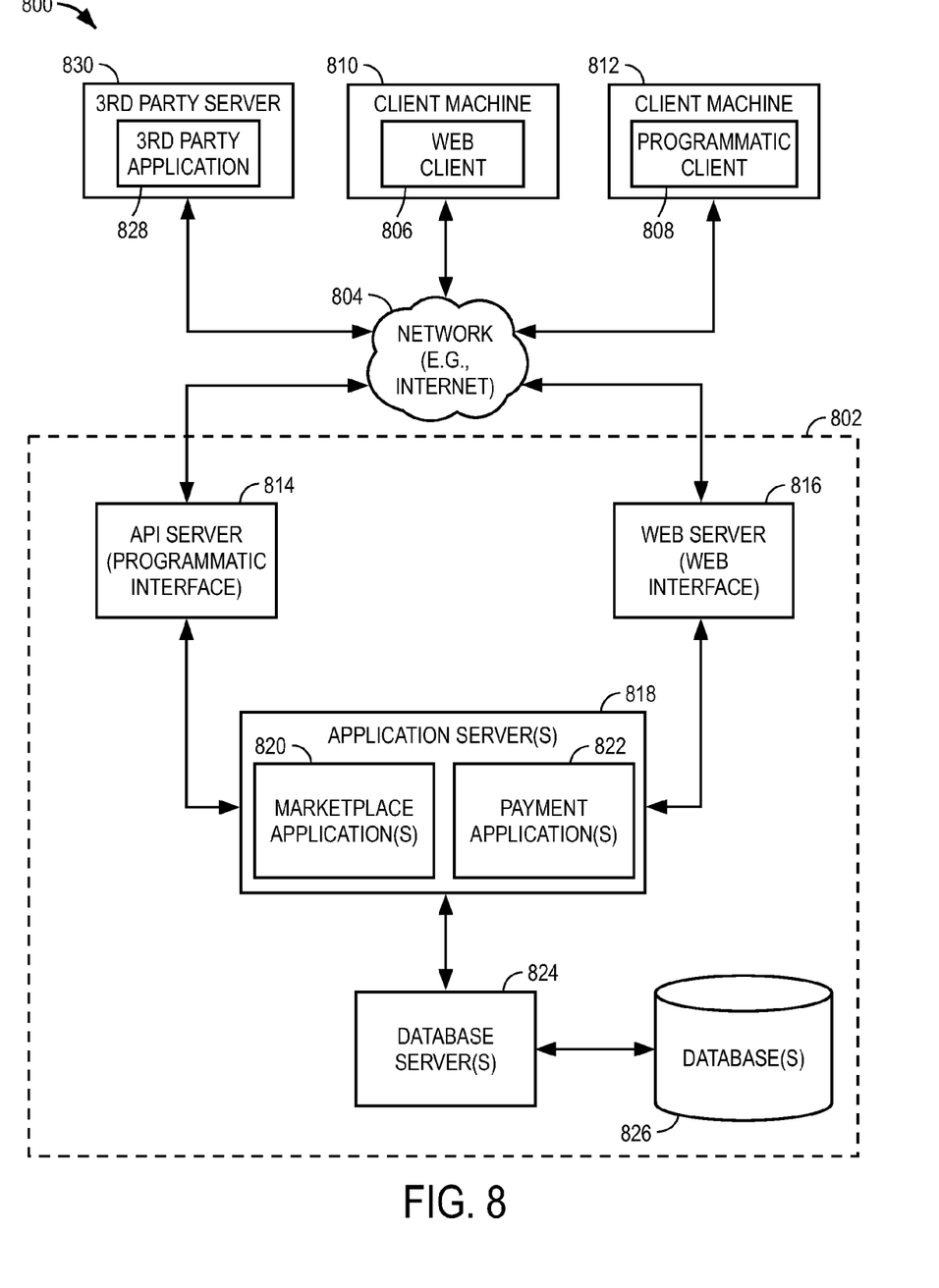
FIG. 8 is a network diagram depicting a client-server system within which an example embodiment may be deployed.

FIG. 8 is a network diagram depicting a client-server system 800, within which one example embodiment may be deployed. A networked system 802, in the example forms of a network-based marketplace or publication system, provides server-side functionality, via a network 804 (e.g., the Internet or Wide Area Network (WAN)) to one or more clients. FIG. 8 illustrates, for example, a web client 806 (e.g., a browser, such as the Internet Explorer browser developed by Microsoft Corporation of Redmond, Washington State), and a programmatic client 808 executing on respective client machines 810 and 812.

An Application Programming Interface (API) server 814 and a web server 816 are coupled to, and provide programmatic and web interfaces respectively to, one or more application servers 818. The application servers 818 host one or more marketplace applications 820 and payment applications 822. The application servers 818 are, in turn, shown to be coupled to one or more databases servers 824 that facilitate access to one or more databases 826.

The marketplace applications 820 may provide a number of marketplace functions and services to users that access the networked system 802. The payment applications 822 may likewise provide a number of payment services and functions to users. The payment applications 822 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 820. While the marketplace and payment applications 820 and 822 are shown in FIG. 8 to both form part of the networked system 802, it will be appreciated that, in alternative embodiments, the payment applications 822 may form part of a payment service that is separate and distinct from the networked system 802.

Further, while the system 800 shown in FIG. 8 employs a client-server architecture, the present invention is of course not limited to such an architecture, and could equally well find application in a distributed, or peer-to-peer, architecture system, for example. The various marketplace and payment applications 820 and 822 could also be implemented as standalone software programs, which do not necessarily have networking capabilities.

The web client 806 accesses the various marketplace and payment applications 820 and 822 via the web interface supported by the web server 816. Similarly, the programmatic client 808 accesses the various services and functions provided by the marketplace and payment applications 820 and 822 via the programmatic interface provided by the API server 814. The programmatic client 808 may, for example, be a seller application (e.g., the TurboLister application developed by eBay Inc., of San Jose, Calif.) to enable sellers to author and manage listings on the networked system 802 in an off-line manner, and to perform batch-mode communications between the programmatic client 808 and the networked system 802. Some embodiments of the present invention may be implemented by components of the marketplace application(s) 820. For example, there may be a category system or engine that performs the category management and analysis which provides the information displayed in the user interfaces depicted in FIGS. 3-7.

FIG. 8 also illustrates a third party application 828, executing on a third party server machine 830, as having programmatic access to the networked system 802 via the programmatic interface provided by the API server 814. For example, the third party application 828 may, utilizing information retrieved from the networked system 802, support one or more features or functions on a website hosted by the third party. The third party website may, for example, provide one or more promotional, marketplace or payment functions that are supported by the relevant applications of the networked system 802.

Figure 9:
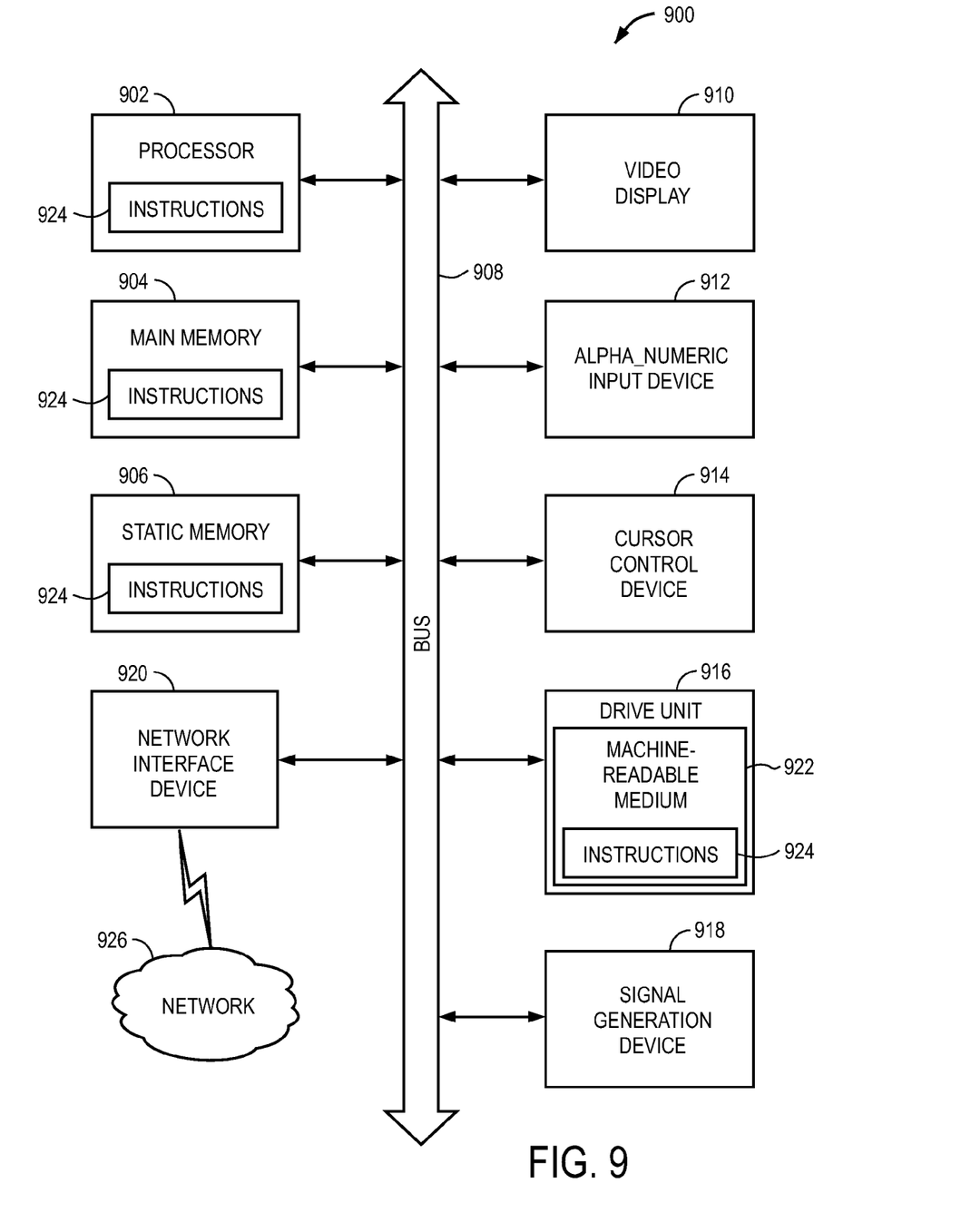
FIG. 9 is a block diagram of a machine in the example form of a computer system within which a set of instructions, for causing the machine to perform any one or more of the methodologies discussed herein, may be executed.

FIG. 9 shows a diagrammatic representation of machine in the example form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU) a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable storage medium 922 on which is stored one or more sets of instructions (e.g., software 924) embodying any one or more of the methodologies or functions described herein. The software 924 may also reside, completely or at least partially, within the main memory 904, within the static memory 906, and/or within the processor 902 during execution thereof by the computer system 900, the main memory 904 and the processor 902 also constituting machine-readable media. The software 924 may further be transmitted or received over a network 926 via the network interface device 920.

While the machine-readable storage medium 922 is shown in an example embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, solid-state memories, optical and magnetic media, and carrier wave signals.

Thus, a method and system for category management and analysis have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In the foregoing description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the description, with each claim standing on its own as a separate embodiment.

What is claimed is:

1. A method comprising:
   providing a set of instructions to a client device that cause the client device to display a user interface that comprises a portion including a list of marketplace categories associated with an electronic commerce marketplace;
   receiving, via the client device, a user selection of a marketplace category from the list of marketplace categories associated with an electronic commerce marketplace;
   accessing data associated with the marketplace category;
   analyzing, using a processor, the data associated with the marketplace category to identify a plurality of keywords used in previously submitted search queries to identify listings in the marketplace category;
   providing a set of instructions to the client device that cause the client device to display an additional portion of the user interface to present results of the analyzing, the additional portion of the user interface including at least a portion of the plurality of keywords used in previously submitted search queries to identify listings in the marketplace category, the portion of the plurality of keywords being displayed in a ranked order based on popularity on a default date, the additional portion of the user interface further including a visual symbol associated with each keyword, the visual symbol associated with each keyword indicating a change in popularity with the associated keyword;
   receiving user input including a user specified date entered into a date input field included as part of the user interface;
   recalculating the popularity of the plurality of keywords at the user specified date;
   providing a set of instructions to the client device that cause the client device to update the additional portion of the user interface based on the popularity of the plurality of keywords on the user specified date, the updating of the additional portion of the user interface including updating the ranked order of the portion of the plurality of keywords based on the popularity of the plurality of keywords on the user specified date; and
   creating a product description of an item in a sale listing including at least one keyword from the plurality of keywords used in previously submitted search queries to identify listings in the marketplace category.

2. The method of claim 1, wherein the portion of the plurality of keywords used in previously submitted search queries to identify listings in the marketplace category includes keywords having a high popularity within the marketplace category.

3. The method of claim 1, wherein the visual symbol indicates whether the associated keyword's popularity is increasing, decreasing, or unchanged.

4. The method of claim 1, wherein the user interface further includes a graph that includes keyword trend information associated with a particular keyword over a period of time.

5. The method of claim 1, wherein the user interface further includes a graph that includes keyword trend information associated with a plurality of keywords over a period of time.

6. The method of claim 1, wherein the user interface further includes hot keywords with a high number of searches within the marketplace category at a current time.

7. The method of claim 1, wherein the user interface further includes a user-selectable display element that, when activated, displays at least one entity having a high number of transactions in the marketplace category.

8. The method of claim 1, wherein the user interface further includes a user-selectable display element that, when activated, displays at least one item in the marketplace category having a high number of sale transactions.

9. A non-transitory machine-readable storage medium comprising instructions that, when executed by one or more processors of a machine, cause the machine to perform operations comprising:
   providing a set of instructions to a client device that cause the client device to display a user interface that comprises a portion including a list of marketplace categories associated with an electronic commerce marketplace;
   receiving, via the client device, a user selection of a marketplace category from the list of marketplace categories associated with an electronic commerce marketplace;
   accessing data associated with the marketplace category;
   analyzing the data associated with the marketplace category to identify a plurality of keywords used in previously submitted search queries to identify listings in the marketplace category;
   providing a set of instructions to the client device that cause the client device to display an additional portion of the user interface to present results of the analyzing, the additional portion of the user interface including at least a portion of the plurality of keywords used in previously submitted search queries to identify listings in the marketplace category, the portion of the plurality of keywords being displayed in a ranked order based on popularity on a default date, the additional portion of the user interface further including a visual symbol associated with each keyword, the visual symbol associated with each keyword indicating a change in popularity with the associated keyword;
   receiving user input including a user specified date entered into a date input field included as part of the user interface;
   recalculating the popularity of the plurality of keywords at the user specified date;
   providing a set of instructions to the client device that cause the client device to update the additional portion of the user interface based on the popularity of the plurality of keywords on the user specified date, the updating of the additional portion of the user interface including updating the ranked order of the portion of the plurality of keywords based on the popularity of the plurality of keywords on the user specified date; and creating a product description of an item in a sale listing including at least one keyword from the plurality of keywords used in previously submitted search queries to identify listings in the marketplace category.

10. The method of claim 1, wherein the plurality of keywords are keywords entered by users seeking to purchase a particular item within the marketplace category.

11. The method of claim 1, wherein the plurality of keywords are buyer search terms that buyers have used to locate items in the marketplace category and a seller may want to include in a product description within the marketplace category.

12. A computer system comprising:
one or more processors; and
one or more computer storage media storing computer-useable instructions that, when used by the one or more processors, cause the computer system to:
provide a set of instructions to a client device that cause the client device to display a user interface that comprises a portion including a list of marketplace categories associated with an electronic commerce marketplace;
receive, via the client device, a user selection of a marketplace category from the list of marketplace categories associated with an electronic commerce marketplace;
access data associated with the marketplace category;
analyze, using a processor, the data associated with the marketplace category to identify a plurality of keywords used in previously submitted search queries to identify listings in the marketplace category;
provide a set of instructions to the client device that cause the client device to display an additional portion of the user interface to present results of the analyzing, the additional portion of the user interface including at least a portion of the plurality of keywords used in previously submitted search queries to identify listings in the marketplace category, the portion of the plurality of keywords being displayed in a ranked order based on popularity on a default date, the additional portion of the user interface further including a visual symbol associated with each keyword, the visual symbol associated with each keyword indicating a change in popularity with the associated keyword;
receive user input including a user specified date entered into a date input field included as part of the user interface;
recalculate the popularity of the plurality of keywords at the user specified date;
provide a set of instructions to the client device that cause the client device to update the additional portion of the user interface based on the popularity of the plurality of keywords on the user specified date, the updating of the additional portion of the user interface including updating the ranked order of the portion of the plurality of keywords based on the popularity of the plurality of keywords on the user specified date; and
create a product description of an item in a sale listing including at least one keyword from the plurality of keywords used in previously submitted search queries to identify listings in the marketplace category.

13. The system of claim 12, wherein the portion of the plurality of keywords used in previously submitted search queries to identify listings in the marketplace category includes keywords having a high popularity within the marketplace category.

14. The system of claim 12, wherein the visual symbol indicates whether the associated keyword's popularity is increasing, decreasing, or unchanged.

15. The system of claim 12, wherein the user interface further includes a graph that includes keyword trend information associated with a particular keyword over a period of time.

16. The system of claim 12, wherein the user interface further includes a graph that includes keyword trend information associated with a plurality of keywords over a period of time.

17. The system of claim 12, wherein the user interface further includes hot keywords with a high number of searches within the marketplace category at a current time.

18. The system of claim 12, wherein the user interface further includes a user-selectable display element that, when activated, displays at least one entity having a high number of transactions in the marketplace category.

19. The system of claim 12, wherein the user interface further includes a user-selectable display element that, when activated, displays at least one item in the marketplace category having a high number of sale transactions.

20. The system of claim 12, wherein the plurality of keywords are keywords entered by users seeking to purchase a particular item within the marketplace category.

* * * * *